US012809070B2

(12) United States Patent
Hanania et al.

(10) Patent No.: US 12,809,070 B2
(45) Date of Patent: Nov. 24, 2026

(54) ON-CHIP NANOSCALE DIFFRACTIVE OPTICAL ELEMENT

(71) Applicant: Samsung Electronics Co., Ltd., Suwon-si (KR)

(72) Inventors: Haeri Park Hanania, Sierra Madre, CA (US); Radwanul Hasan Siddique, Monrovia, CA (US); Mahsa Torfeh, Los Angeles, CA (US); Yibing Michelle Wang, Temple City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 231 days.

(21) Appl. No.: 18/225,099

(22) Filed: Jul. 21, 2023

(65) Prior Publication Data

US 2024/0377563 A1 Nov. 14, 2024

Related U.S. Application Data

(60) Provisional application No. 63/465,246, filed on May 9, 2023, provisional application No. 63/465,247, filed (Continued)

(51) Int. Cl.
*G02B 5/18* (2006.01)
*B82Y 20/00* (2011.01)

(Continued)

(52) U.S. Cl.
CPC ............ *G02B 5/1866* (2013.01); *B82Y 20/00* (2013.01); *G02B 1/002* (2013.01); *G02B 1/118* (2013.01); *G02B 2207/101* (2013.01)

(58) Field of Classification Search
CPC ............ G02B 5/1866; G02B 2207/101; G02B 5/1809; G02B 27/4205
See application file for complete search history.

(56) References Cited

U.S. PATENT DOCUMENTS 10,527,851 B2 1/2020 Lin et al.
11,041,713 B2 6/2021 Han et al.

(Continued)

FOREIGN PATENT DOCUMENTS

CN 112925111 A 6/2021
CN 114609722 A 6/2022

(Continued)

OTHER PUBLICATIONS

Hanania et al. U.S. Appl. No. 18/225,097, filed Jul. 21, 2023 (Year: 2023).*

(Continued)

*Primary Examiner* — Cara E Rakowski
(74) *Attorney, Agent, or Firm* — Renaissance IP Law Group LLP

(57) ABSTRACT

A diffractive optical element (DOE) includes a substrate layer; and a nanostructure layer comprising nanostructures having a predetermined periodicity ranging from 0.75λ to 3λ of a target wavelength λ. The nanostructures are pillar-shaped nanostructures formed on a surface of the substrate layer, holes formed in the substrate layer, or a combination thereof. At least one nanostructure has a plan-view cross-sectional shape of a circle, an oval, a square, or a rectangle. The plan-view cross-sectional shape of at least one nanostructure includes a rounded corner having a corner radius selected based on a desired light dot nonuniformity of a diffraction pattern generated by the DOE. When the nanostructures are pillar-shaped, a refractive index of the nanostructures is greater than a refractive index of the substrate layer. When the nanostructures are holes, a refractive index of the nanostructures is less than a refractive index of the substrate layer.

20 Claims, 14 Drawing Sheets

Related U.S. Application Data on May 9, 2023, provisional application No. 63/431,617, filed on Dec. 9, 2022.

(51) Int. Cl.

| | |
|---|---|
| ***G02B 1/00*** | (2006.01) |
| ***G02B 1/118*** | (2015.01) |

(56) References Cited

U.S. PATENT DOCUMENTS

| | | | | |
|---|---|---|---|---|
| 11,256,081 | B2 | 2/2022 | Park et al. | |
| 2010/0328587 | A1* | 12/2010 | Yamada | G02B 5/1809 349/106 |
| 2014/0168651 | A1 | 6/2014 | Guo | |
| 2018/0045953 | A1* | 2/2018 | Fan | G02F 1/01 |
| 2018/0217395 | A1* | 8/2018 | Lin | G02B 27/4272 |
| 2018/0246262 | A1* | 8/2018 | Zhan | G02B 5/1814 |
| 2019/0049235 | A1* | 2/2019 | Han | G02B 5/1842 |
| 2021/0208256 | A1 | 7/2021 | Kim et al. | |
| 2021/0271000 | A1 | 9/2021 | Park et al. | |
| 2022/0102563 | A1* | 3/2022 | Wang | G02B 1/005 |
| 2022/0179125 | A1 | 6/2022 | Ren et al. | |
| 2022/0385042 | A1 | 12/2022 | Devlin et al. | |
| 2024/0012177 | A1* | 1/2024 | Forouzmand | H10F 39/806 |

FOREIGN PATENT DOCUMENTS

| | | | |
|---|---|---|---|
| CN | 114637060 | A | 6/2022 |
| CN | 114740687 | A | 7/2022 |
| CN | 217467226 | U | 9/2022 |
| KR | 102129858 | B1 | 7/2020 |
| TW | 201741694 | A | 12/2017 |
| WO | 2021130085 | A1 | 7/2021 |
| WO | 2022049090 | A1 | 3/2022 |
| WO | 2022078892 | A1 | 4/2022 |
| WO | 2022187430 | A1 | 9/2022 |
| WO | 2022243252 | A1 | 11/2022 |

OTHER PUBLICATIONS

Office Action for U.S. Appl. No. 18/225,097, mailed May 19, 2026.
Final Office Action for U.S. Appl. No. 18/225,097, mailed Oct. 9, 2026.

* cited by examiner

ON-CHIP NANOSCALE DIFFRACTIVE OPTICAL ELEMENT

CROSS-REFERENCE TO RELATED APPLICATIONS

This application claims the priority benefit under 35 U.S.C. § 119(e) of U.S. Provisional Patent Application Serial No. 63/431,617, filed on Dec. 9, 2022; and U.S. Provisional Patent Application Serial Nos. 63/465,246 and 63/465,247, both filed on May 9, 2023, the disclosures of which are incorporated herein by reference in their entirety. Additionally, this application is related to U.S. patent application Ser. No. 18/225,097.

TECHNICAL FIELD

The subject matter disclosed herein relates to diffractive optical elements. More particularly, the subject matter disclosed herein relates to diffractive optical elements having a predetermined periodicity that is on the order of a target wavelength.

BACKGROUND

Diffractive optical elements (DOEs) generate desired optical patterns by controlling diffraction of light. DOEs may be used in combination with a vertical-cavity surface emitting laser (VCSEL) for 3D sensing (ADAS, AR/VR, healthcare, security, etc.), and for optical sensing (microfluidics and other photonic sensors, etc.). Commercial DOEs may include multiple levels and complex microscale designs, and may be formed from polymers, which are not compatible with complementary metal-oxide semiconductor (CMOS) fabrication techniques.

FIG. 1 depicts an example Diffractive Optical Element (DOE) 100 that generates a light diffraction pattern. Conventional DOEs may also be called gratings or diffraction gratings. As depicted in FIG. 1, light 101 that is output from a laser source and having a target wavelength λ is incident on the DOE 100. As the light 101 passes through the DOE 100, the DOE 100 generates a light diffraction pattern 102. Several example light diffraction patterns having lines and/or dots are depicted at 103. Light diffraction patterns that may be generated by DOEs are not limited to the example diffraction patterns depicted at 103.

A conventional DOE has a microscale periodicity that is greater than 10 times a target wavelength (>10λ) and has a structure that typically has multiple different heights. A conventional DOE design also tends to be complex and involves multiple fabrication steps. Conventional DOEs are formed from polymers, which makes fabrication of a conventional DOE incompatible with CMOS fabrication techniques.

Another class of DOEs, commonly called metasurfaces, have a microscale periodicity that is on the order of one-half of the target wavelength (~λ/2). This class of DOEs are used to absorb, reflect, deflect and/or focus light (both near- and far-field) at a target wavelength λ. This class of DOEs typically have low transmission efficiency and have a complex design.

SUMMARY

An example embodiment provides a diffractive optical element that may include a substrate layer, and a nanostructure layer that may include nanostructures having a predetermined periodicity ranging from 0.75λ to 3λ of a target wavelength λ. In one embodiment, the nanostructures may include pillar-shaped nanostructures formed on a surface of the substrate layer, holes formed in the substrate layer, or a combination thereof. In another embodiment, at least one nanostructure may include a plan-view cross-sectional shape of a circle, an ellipse, a square, or a rectangle, and a size of the nanostructures may range from 0.75λ to 3λ of a target wavelength λ. In still another embodiment, a plan-view cross-sectional shape of at least one nanostructure may include a rounded corner having a corner radius selected based on a light dot nonuniformity of a diffraction pattern generated by the diffractive optical element. In yet another embodiment, the nanostructures may include pillar-shaped nanostructures formed on the surface of the substrate layer, and a refractive index of the nanostructures may be greater than a refractive index of the substrate layer. In one embodiment, the nanostructures may include holes formed in the substrate layer, and a refractive index of the nanostructures may be less than a refractive index of the substrate layer. In another embodiment, the substrate layer and the nanostructures may include materials that may be compatible with complementary metal-oxide semiconductor processing techniques. In still another embodiment, the substrate layer may include silicon dioxide, and the nanostructures may include pillar-shaped nanostructures and silicon nitride. In yet another embodiment, a first predetermined region of the nanostructure layer may include a first predetermined periodicity and a first nominal nanostructure size, a second predetermined region of the nanostructure layer may include a second predetermined periodicity, a second nominal nanostructure size, or a combination thereof, and the first predetermined periodicity may be different from the second predetermined periodicity and the first nominal nanostructure size may be different from the second nominal nanostructure size. In one embodiment, the diffractive optical element may include an anti-reflective coating formed on at least one of the substrate layer and the nanostructure layer.

An example embodiment provides a method to fabricate a diffractive optical element in which the method may include: forming a substrate layer; and forming a nanostructure layer that may include nanostructures having a predetermined periodicity ranging from 0.75λ to 3λ of a target wavelength λ, and the nanostructure layer may be formed on a surface of the substrate layer, within the substrate layer, or a combination thereof. In one embodiment, the nanostructures may include pillar-shaped nanostructures formed on the surface of the substrate layer, holes formed within the substrate layer, or a combination thereof. In another embodiment, at least one nanostructure may include a plan-view cross-sectional shape of a circle, an ellipse, a square, or a rectangle, and a size of the nanostructures may range from 0.75λ to 3λ of a target wavelength λ, In still another embodiment, a plan-view cross-sectional shape of at least one nanostructure may include a rounded corner having a corner radius selected based on a light dot nonuniformity of a diffraction pattern generated by the diffractive optical element. In yet another embodiment, the nanostructures may include pillar-shaped nanostructures formed on the surface of the substrate layer, and a refractive index of the nanostructures may be greater than a refractive index of the substrate layer. In one embodiment, the nanostructures may include holes formed in the substrate layer, and a refractive index of the nanostructures may be less than a refractive index of the substrate layer. In another embodiment, the substrate layer and the nanostructures may include materials that may be compatible with complementary metal-oxide semiconductor processing techniques. In still another embodiment, the substrate layer may include silicon dioxide, and the nanostructures may include pillar-shaped nanostructures and silicon nitride. In yet another embodiment, a first predetermined region of the nanostructure layer may include a first predetermined periodicity and a first nominal nanostructure size, a second predetermined region of the nanostructure layer may include a second predetermined periodicity, a second nominal nanostructure size, or a combination thereof, and the first predetermined periodicity may be different from the second predetermined periodicity and the first nominal nanostructure size may be different from the second nominal nanostructure size. In one embodiment, the method may further include forming an anti-reflective coating on at least one of the substrate layer and the nanostructure layer.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
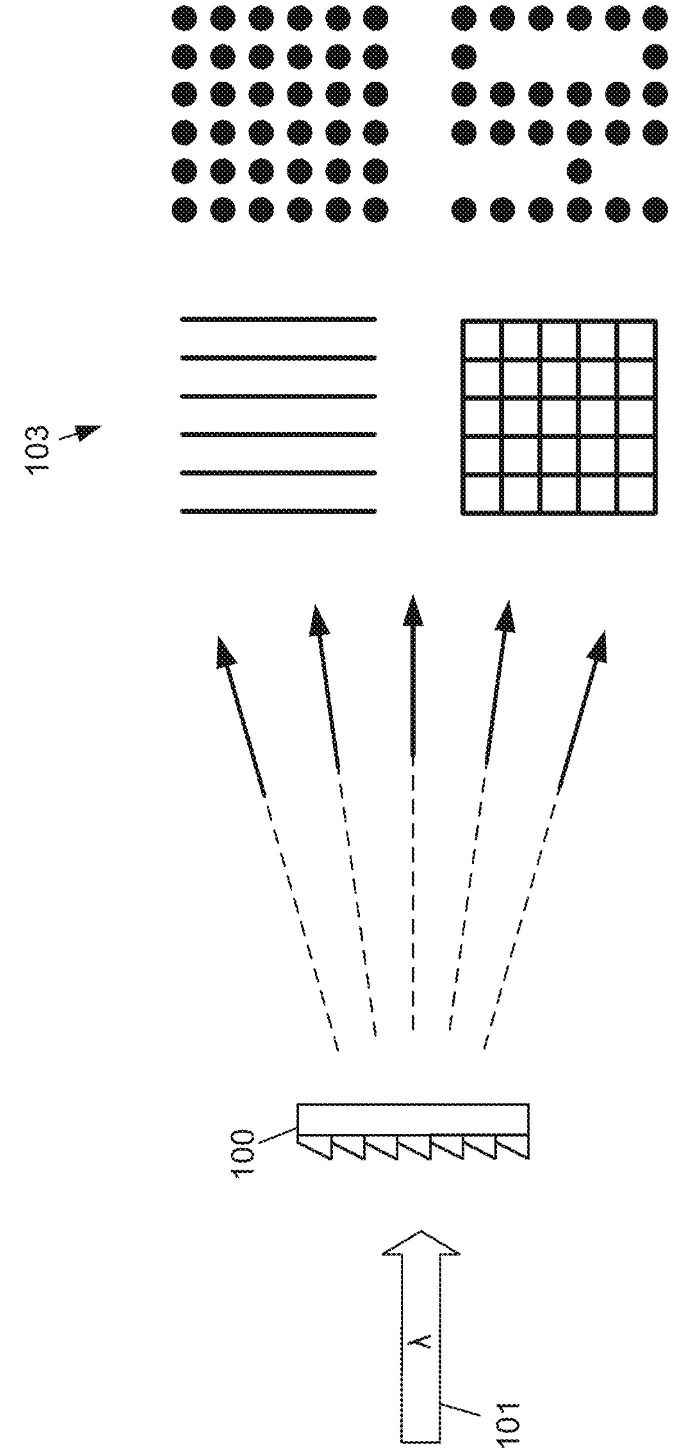
FIG. 1 depicts an example diffractive optical element that generates a light diffraction pattern.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein provides a DOE that includes a metasurface having a periodicity and a size of nanostructures that are comparable to or smaller than a target light wavelength (i.e., 0.75λ to 3λ), which makes the metasurface of nanoscale size. In one embodiment, a DOE disclosed herein may be formed as a single layer; and has a periodic structure that may be designed for a target field of view. A metasurface design for a DOE disclosed herein includes nanostructures that, depending upon the application, may have arbitrarily shaped geometries and may have rounded corners of radius. The corners of radius may be optimized for transmission efficiency and for nonuniformity of light-dot intensity for a resulting diffraction pattern. Alternatively, and again depending upon the application, the nanostructures may be designed to have substantially square corners. Additionally, a DOE disclosed herein may be formed using a technique that does not involve complicated fabrication processes, and may be formed from CMOS-compatible materials, such as $SiO_2$ and SiN. Accordingly, a DOE disclosed herein may be integrated on-chip and may be optimal for mass production in may diverse electronic devices including, but not limited to, smartphones, tablets, smartwatches, etc.

One example embodiment of a DOE disclosed herein has a target wavelength of 905 nm, a metasurface having a periodicity (i.e., a lattice constant) of 1.36 μm, and nanostructure pillars having a thickness (or height) of 1.3 μm and a pillar width of 910 nm. A plan-view of the nanostructure pillars may be squarish-shaped nanostructures having rounded corners of radius 0.4 μm, which has been optimized to provide a transmission efficiency of about 84% and a nonuniformity of light-dot intensity of about 0.016, which is greater than a 5-fold improvement over conventional DOE techniques (~0.091 light-dot intensity nonuniformity). The nanostructure pillar arrangement for this example embodiment is a single-layer structure that involves five simple fabrication steps and that may be formed from of a CMOS-compatible silicon nitride (SiN).

DOEs disclosed herein may typically generate less than 10 higher-order modes in contrast to conventional DOEs, which may generate between 1 and about 50 higher-order modes. The other class of DOEs (metasurfaces) may generate less than five higher-order modes. Additionally, although both a DOE disclosed herein and a conventional DOE may be designed for 3-dimensional (3D) sensing, the optics associated with a conventional DOE for 3D sensing include a patterned source (i.e., a vertical-cavity surface emitting laser (VCSEL)), a collimator, and a fan-out DOE having a total track length (TTL) that may range from approximately 3 mm to greater than 10 mm depending upon the design. In contrast, a DOE disclosed herein is of nanoscale size and can be formed directly on a semiconductor sensor, which makes an entire module configured for optical pattern generation and the total tracking length is sub-millimeter.

Figure 2B:
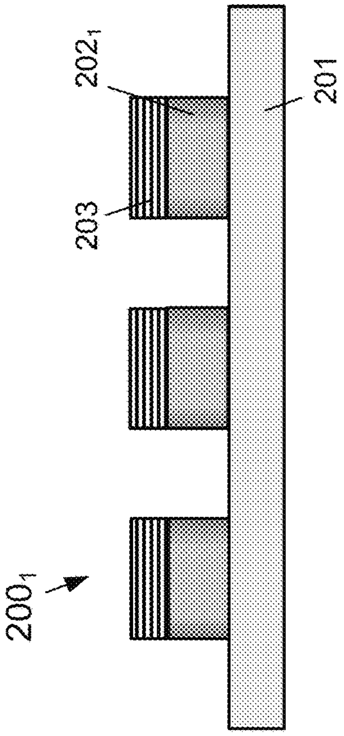
FIGS. 2B-2D depict side views of three different example embodiments of the diffractive optical element depicted in FIG. 2A.
Figure 2C:
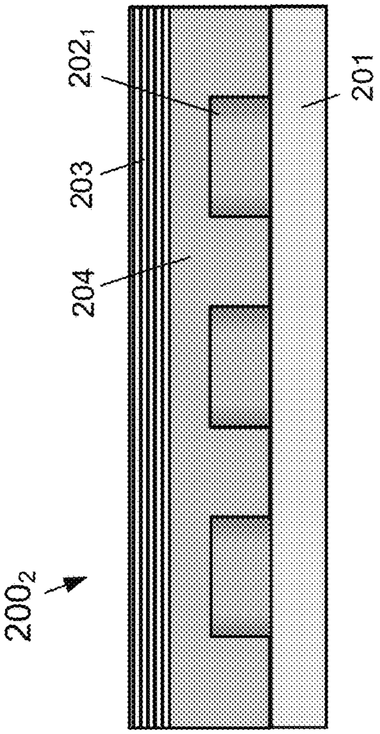
Figure 2D:
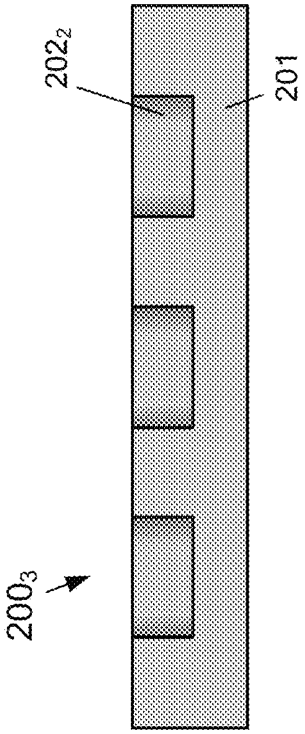
Figure 2A:
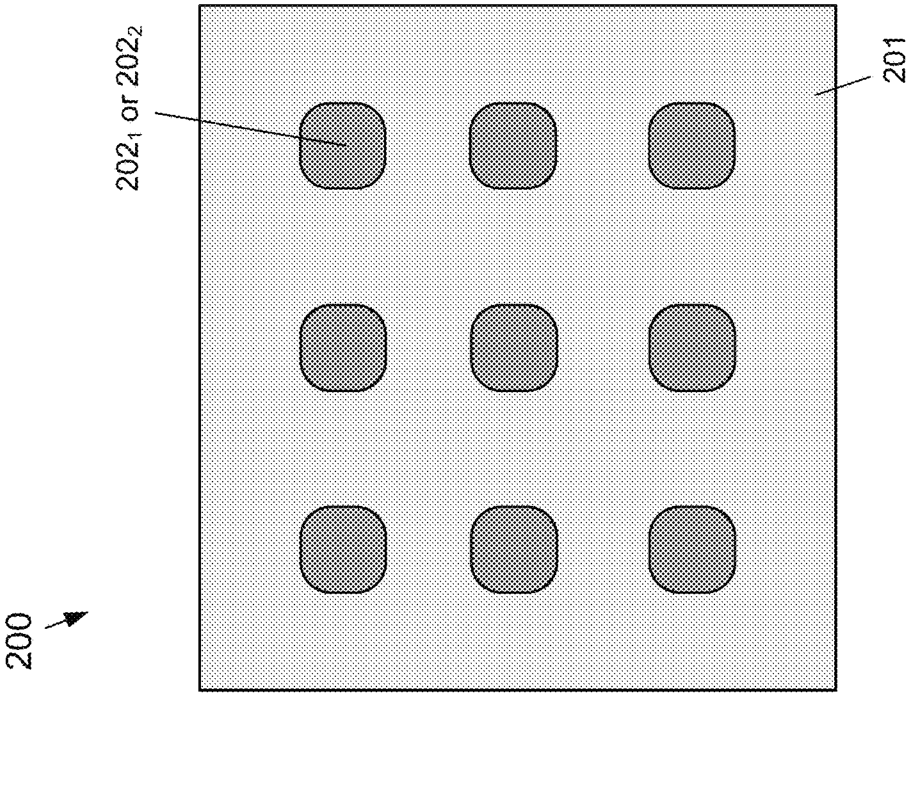
FIG. 2A depicts a plan view of an example embodiment of a diffractive optical element according to the subject matter disclosed herein.

FIG. 2A depicts a plan view of an example embodiment of a DOE 200 according to the subject matter disclosed herein. FIGS. 2B-2D depict side views of three different example embodiments $\mathbf{200}_1$-$\mathbf{200}_3$ of the DOE 200 depicted in FIG. 2A. The DOE 200 may include a substrate 201 and an array of pillars 202$_1$ and/or holes 202$_2$. The example embodiment 200$_1$ depicted in FIG. 2B includes an anti-reflective coating 203 that may be formed directly on each pillar 202$_1$. The example embodiment 200$_2$ depicted in FIG. 2C includes an encapsulation layer 204 formed directly on the pillars 202$_1$ and the substrate 201. An anti-reflective coating 203 may be formed directly on the encapsulation layer 204. The example embodiment 200$_3$ depicted in FIG. 2D includes holes (or cavities) 202$_2$ that may be formed in the substrate 201. In one embodiment, the anti-reflective coatings 203 may be formed from multiple layers of anti-reflective coating materials.

The pillars 202$_1$ may be formed from a CMOS-compatible material having a refractive index that is greater than the refractive index of the substrate 201. The holes 202$_2$ may have a refractive index that is lower than the refractive index of the substrate 201. A nanostructure having pillars 202$_1$ may be used in combination with holes 202$_2$ when a DOE is desired to generate different diffractive patterns or a pattern having different light-dot intensities in different regions of the pattern. As used herein, the term "pillar" may be used interchangeably with the term "hole". The geometry (i.e., the plan-view cross-sectional shape) of the pillars 202$_1$ and the holes 202$_2$ may be a circle, an ellipse, a square, a rectangle, or any other geometry resembling a circle, an ellipse, a square, or a rectangle; or a combination thereof in order to generate a desired optical pattern. Further, the geometry of the pillars 202$_1$ and the holes 202$_2$ may be with or without rounded corners. The rounded corners may have a selected radius that provides a transmission efficiency and/or a light-dot nonuniformity for a desired optical pattern.

Figure 3:
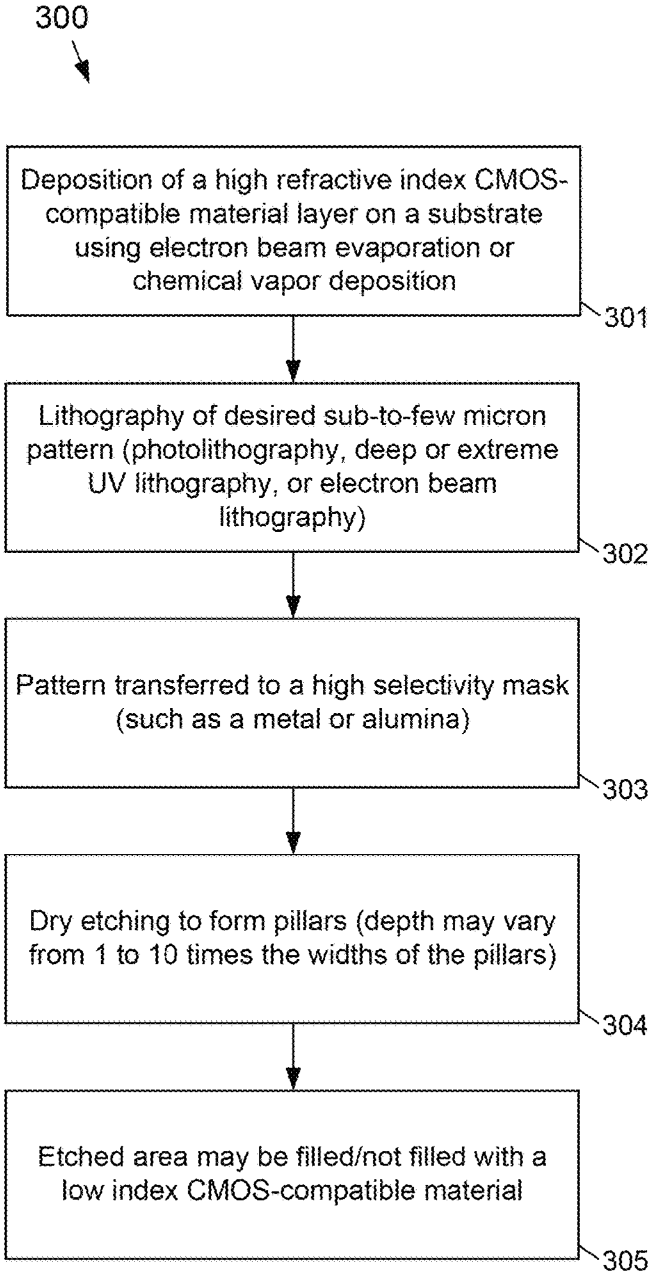
FIG. 3 is a flow diagram of an example embodiment of a process for fabricating a diffractive optical element having pillars according to the subject matter disclosed herein.
Figure 4A:
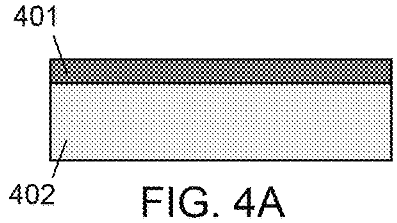
FIGS. 4A-4E are a sequence depicting fabrication of a diffractive optical element that corresponds to operations of the process in FIG. 3 according to the subject matter disclosed herein.
Figure 4B:
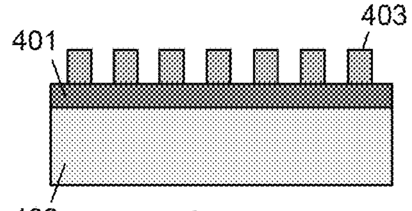
Figure 4C:
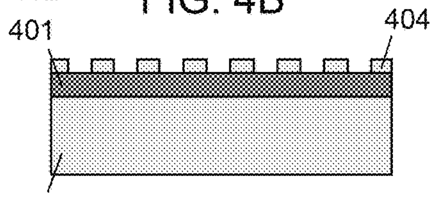
Figure 4D:
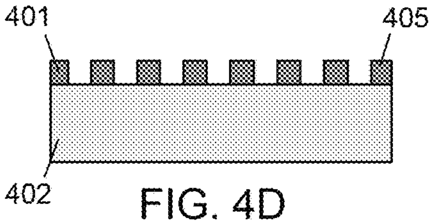
Figure 4E:
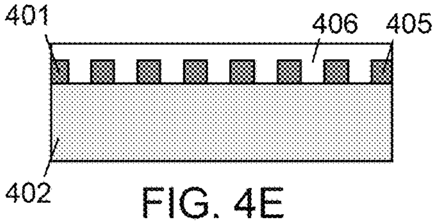

FIG. 3 is a flow diagram of an example embodiment of a process 300 for fabricating a DOE having pillars according to the subject matter disclosed herein. FIGS. 4A-4E are a sequence depicting fabrication of a DOE that corresponds to operations of the process 300 according to the subject matter disclosed herein. At 301 in FIG. 3, a high refractive index CMOS-compatible material layer (layer 401 in FIGS. 4A-4E) is deposited on a substrate 402 using electron beam evaporation or chemical vapor deposition. At 302, a desired sub-to-few micron pattern 403 is formed using lithography, such as photolithography, deep or extreme UV lithography, or electron beam lithography. At 303, the pattern 403 is transferred to a high selectivity mask 404, such as a metal or alumina. At 304, pillars 405 are formed in the CMOS-compatible material layer 401 using a dry etch technique. The depth of the pillars 405 (i.e., the height of the pillars 405 above the substrate 402) may be selected to be between 1 and 10 times the (horizontal) widths of the pillars 405. At 305, the etched areas between the pillars 405 may be filled with a low refractive index CMOS-compatible material 406. Alternatively, the etched areas between the pillars 405 may be left empty (i.e., no low refractive index CMOS-compatible material).

Figure 5C:
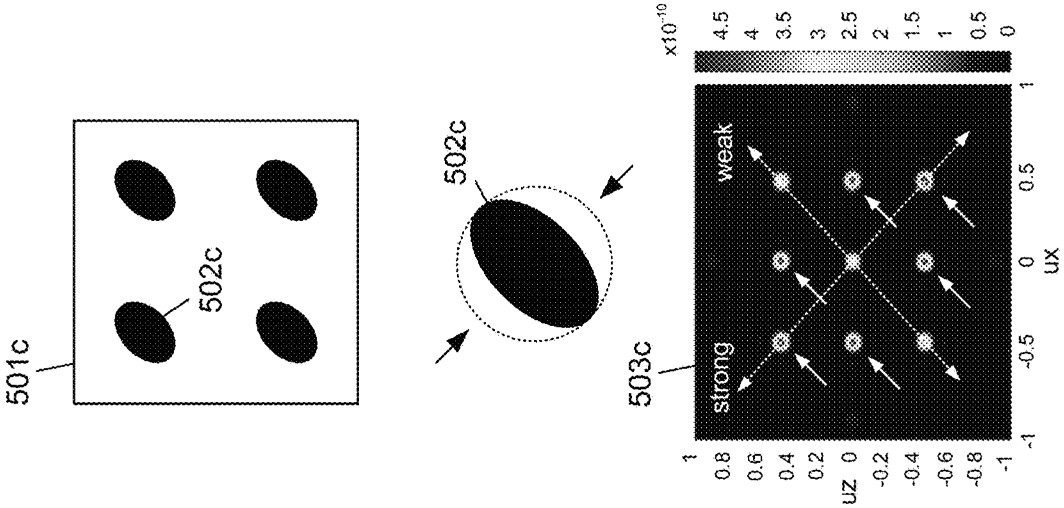
FIGS. 5A-5C depict how changes in pillar geometry may be used for generating changes in light-dot intensity of a diffraction pattern according to the subject matter disclosed herein.
Figure 5B:
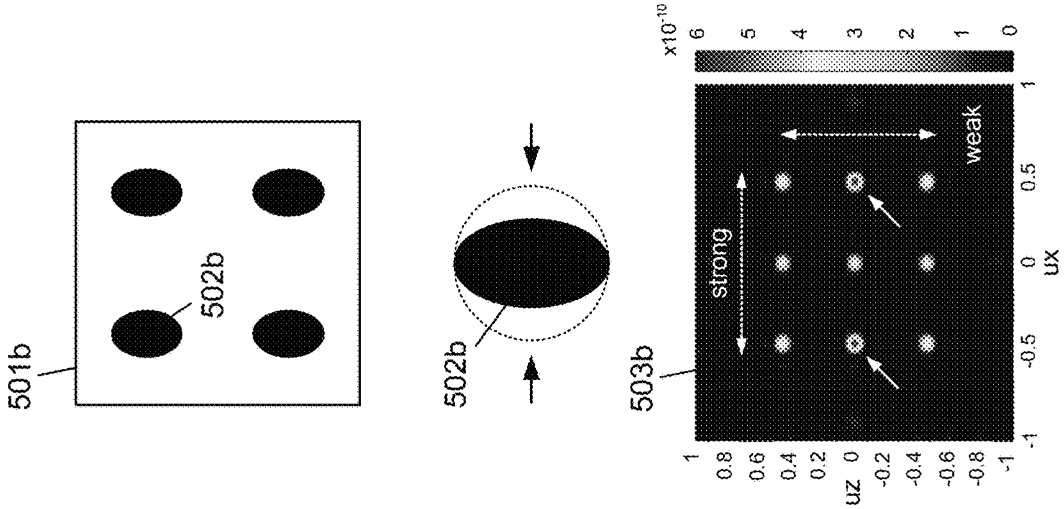
Figure 5A:
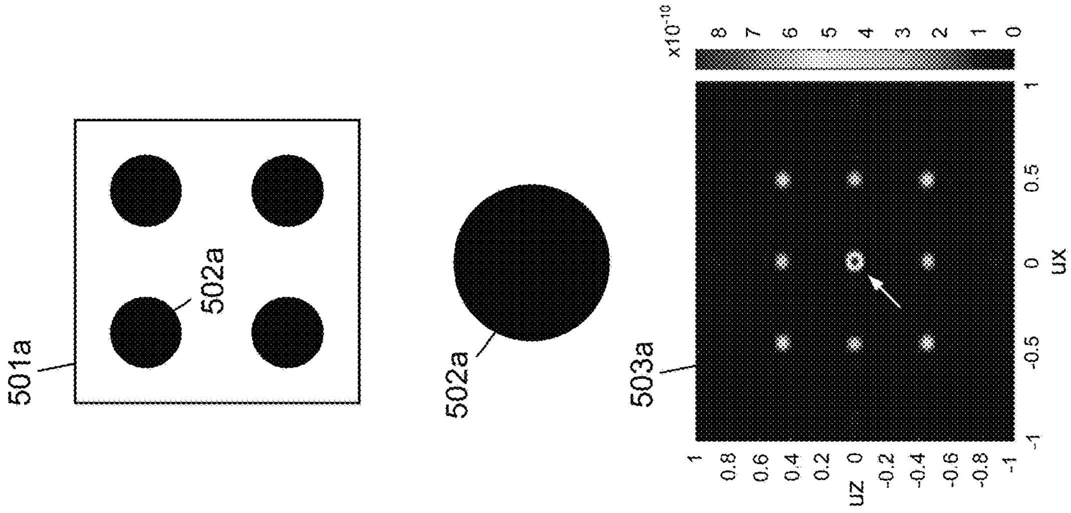

FIGS. 5A-5C depict how changes in pillar geometry may be used for generating changes in light-dot intensity of a diffraction pattern according to the subject matter disclosed herein. An example arrangement 501*a* of four circularly shaped pillars 502*a* is depicted at the plan of FIG. 5A. A plan-view cross-sectional view of an example circularly shaped pillar 502*a* is depicted in the middle of FIG. 5A. A plot of light intensity of a diffraction pattern 503*a* of nine light dots generated by the four circularly shaped pillars is shown at the bottom of FIG. 5A. The center light dot (indicated by an arrow) has the greatest intensity as shown by the presence of a relatively darker high-intensity region within the center of the center light dot as compared to the intensity of the eight light dots surrounding the center light dot. The units for intensity shown in FIGS. 5A-5C are relative, arbitrary units (a.u.) and the strongest peak intensity may be set to 1. The "ux" and "uz" axes indicated in FIGS. 5A-5C are two perpendicular axes in a plan-view cross-sectional plane in which the optical patterns formed by the DOEs in FIGS. 5A-5C are projected.

At the top of FIG. 5B, the shape of each pillar 502*b* of the pattern of pillars 501*b* has been changed so that each pillar has an elliptical shape in which the major axis is oriented along a vertical axis of the figure and the minor axis is oriented along a horizontal axis of the figure. In the middle of FIG. 5B, the changed shape of the cross-section of a pillar 502*b* is depicted as being squeezed along the minor axis of the ellipse. A plot of light intensity of a diffraction pattern 503*b* of the nine light dots generated by the four vertically oriented elliptically shaped pillars is shown at the bottom of FIG. 5B. The changed shape of the pillars results in a change in the intensity pattern of the light dots. That is, the two light dots indicated by arrows now have the greatest intensity of the nine light-dot pattern as indicated by the darker high-intensity region within the centers of the two light dots as compared to the intensity of the seven other light dots of the diffraction pattern. As indicated within the light intensity plot, the relative light-dot intensity has increased along an axis of the light plot that corresponds to the minor axis of the cross-sectional shape of the elliptically shaped pillars. Additionally, the relative light-dot intensity has decreased along an axis of the light plot that corresponds to the major axis of the cross-sectional shape of the elliptically shaped pillars.

At the top of FIG. 5C, the elliptical shape of each pillar 502*c* of the pattern of pillars 501*c* has been rotated so that the major and minor axes of the elliptical shape of the pillar are oriented at 45° from the pillar orientation of FIG. 5B. In the middle of FIG. 5C, the cross-sectional squeezed-shape of a pillar 502*c* is also depicted as being rotated by 45°. A plot of light intensity of a diffraction pattern 503*c* of the nine light dots generated by the four rotated elliptically shaped pillars is shown at the bottom of FIG. 5C. The rotated shape of the pillars results in a change in the intensity pattern of the light dots as compared to FIG. 5B. That is, the six light dots indicated by solid-line arrows now have the greatest intensity of the nine light-dot pattern as indicated by the darker high-intensity region within the centers of the six light dots as compared to the intensity of the three other light dots of the diffraction pattern. As indicated within the light intensity plot, the relative light-dot intensity has increased along an axis of the light plot that corresponds to the minor axis of the cross-sectional shape of the elliptically shaped pillars. The relative light-dot intensity has also decreased along an axis of the light plot that corresponds to the major axis of the cross-sectional shape of the elliptically shaped pillars.

Figure 6A:
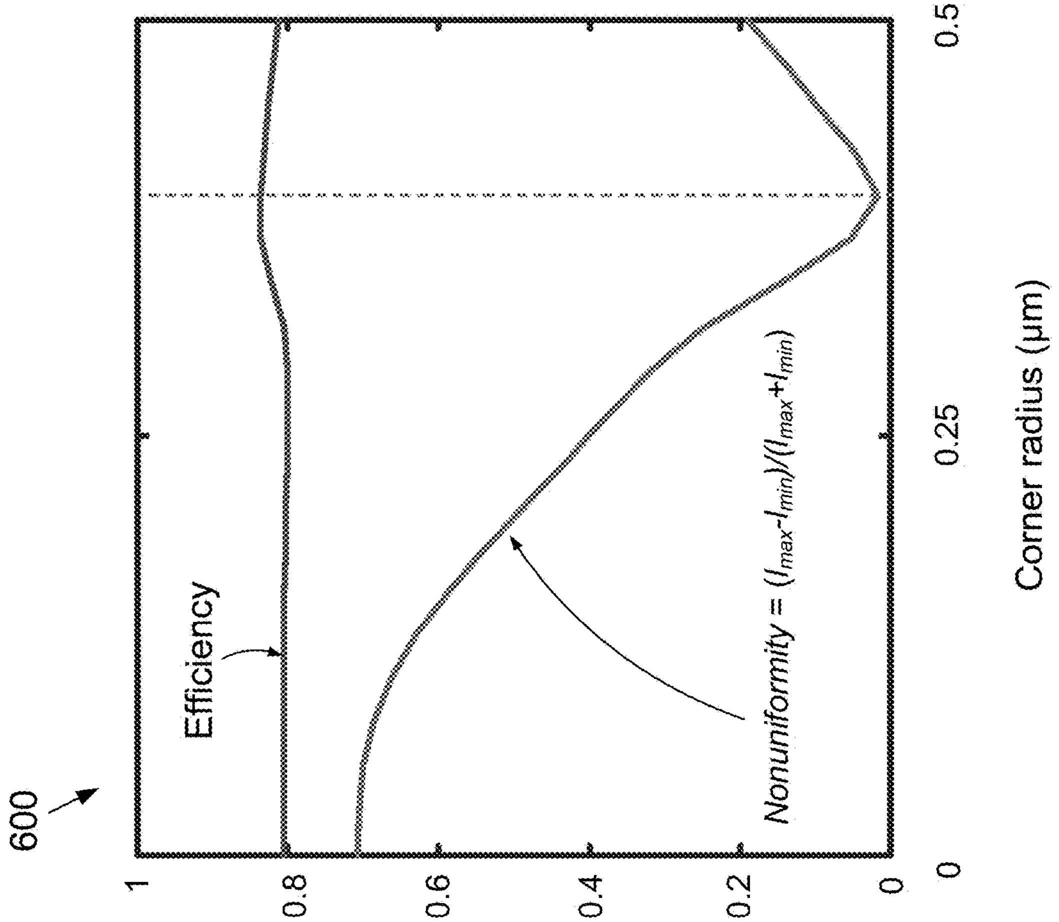
FIG. 6A is a graph of transmission efficiency and intensity nonuniformity as a function of corner radius (μm) of a nanostructure according to the subject matter disclosed herein.

FIG. 6A is a graph 600 of transmission efficiency and intensity nonuniformity as a function of corner radius (μm) of a nanostructure according to the subject matter disclosed herein. Intensity nonuniformity is measured as:

$$\text{Intensity nonuniformity} = \frac{(I_{max} - I_{min})}{(I_{max} + I_{min})},$$

in which $I_{max}$ is the maximum intensity value of the light dots of a diffraction pattern and $I^{min}$ is the minimum intensity value of the light dots of the diffraction pattern. As indicated by the dashed line in FIG. 6A, transmission efficiency is maximum (optimized) and light-dot intensity nonunformity is minimized (also optimized) when the corner radius is 0.4 μm.

Figure 6C:
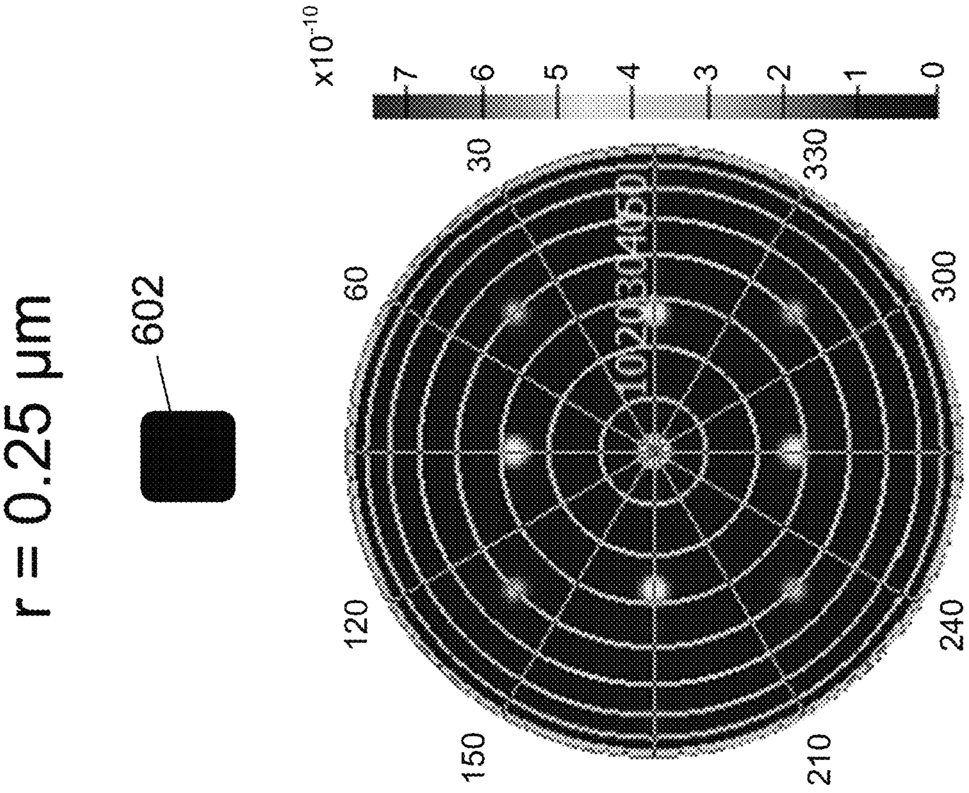
FIGS. 6B-6E show example pillar cross-sectional shapes and corresponding plots of light intensity of diffraction patterns for four different corner radii according to the subject matter disclosed herein.
Figure 6B:
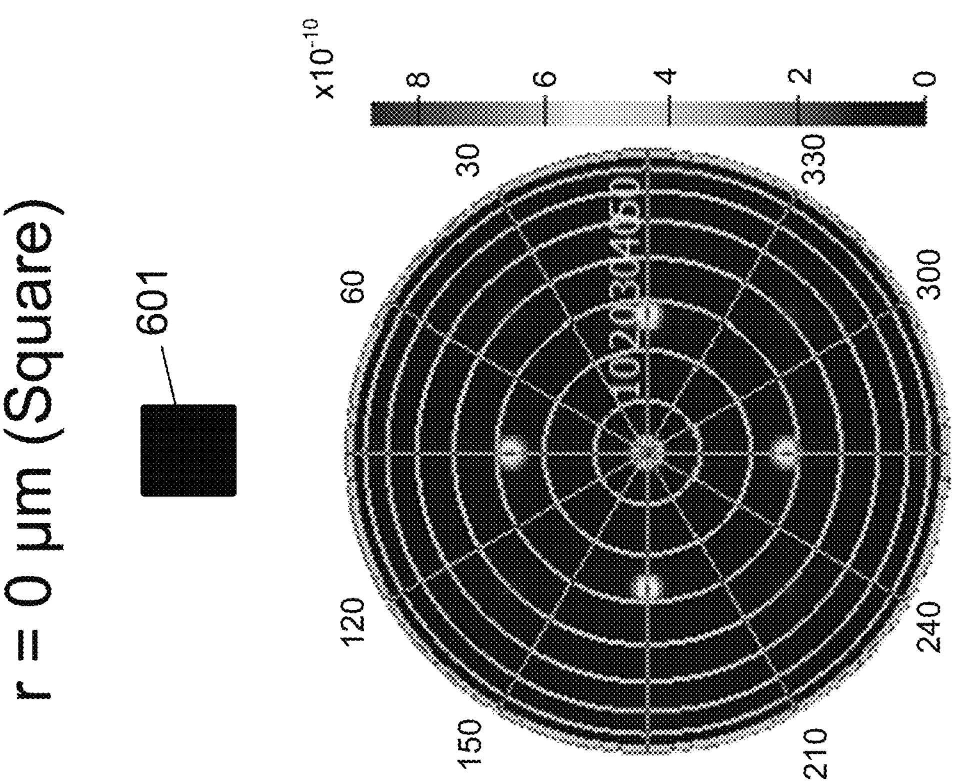
Figure 6E:
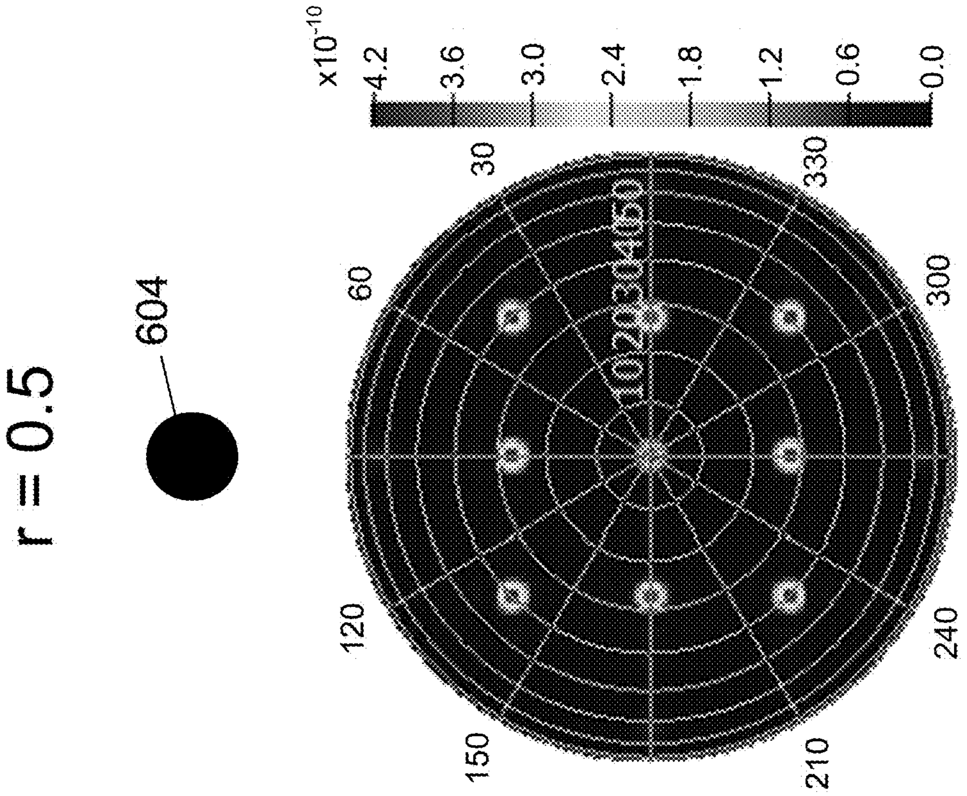
Figure 6D:
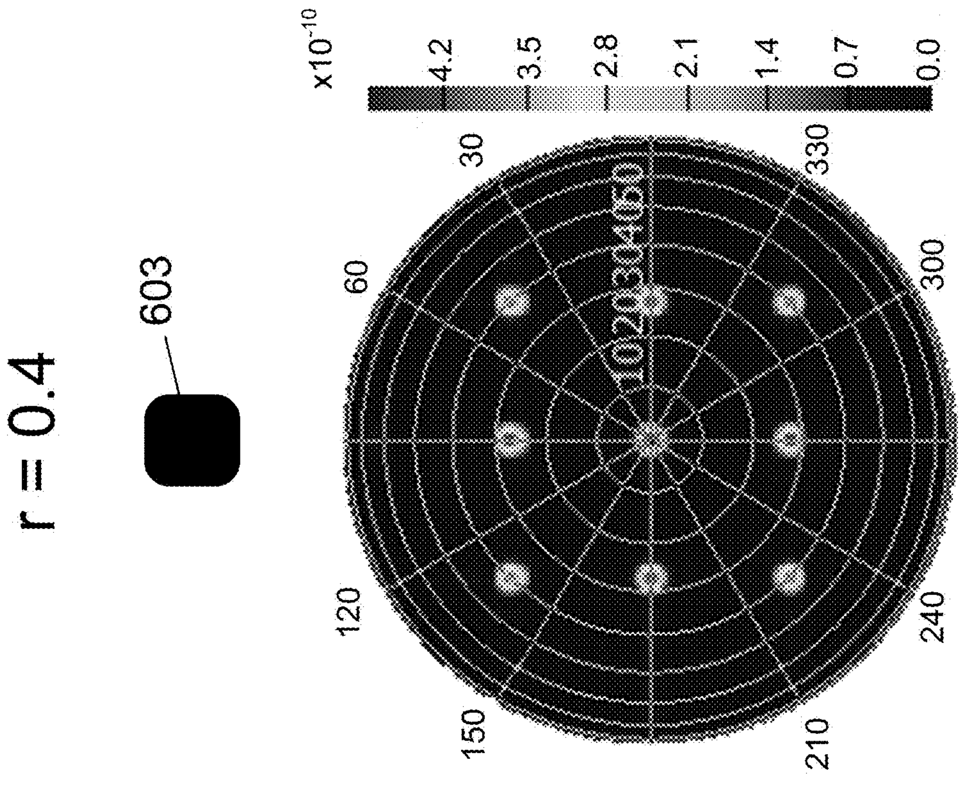

FIGS. 6B-6E show example pillar cross-sectional shapes and corresponding plots of light intensity of diffraction patterns for four different corner radii according to the subject matter disclosed herein. The units for intensity shown in FIGS. 6B-6E are relative, arbitrary units (a.u.) and the strongest peak intensity may be set to 1. Each circle in plots of light intensity diffraction patterns in FIGS. 6B-6E represents a 10° increment of diffraction. In FIG. 6B, the corner radius r=0 μm, and the cross-sectional pillar shape 601 is a square. From the graph in FIG. 6A, the intensity nonuniformity of the nine light dots for a corner radius of 0 μm is about 0.7. In FIG. 6C, the corner radius r=0.25 μm, and the cross-sectional pillar shape is shown at 602. The intensity nonuniformity of the nine light dots for a corner radius of 0.25 μm is about 0.4. In FIG. 6D, the corner radius r=0.4 μm, and the cross-sectional pillar shape is shown at 603. The intensity nonuniformity of the nine light dots for a corner radius of 0.4 μm is about 0.016. In FIG. 6E, the corner radius r=0.5 μm, and the cross-sectional pillar shape is shown at 604 (i.e., a circle cross-sectional shape). The intensity nonuniformity of the nine light dots for a corner radius of 0.5 μm is about 0.18.

Figure 7:
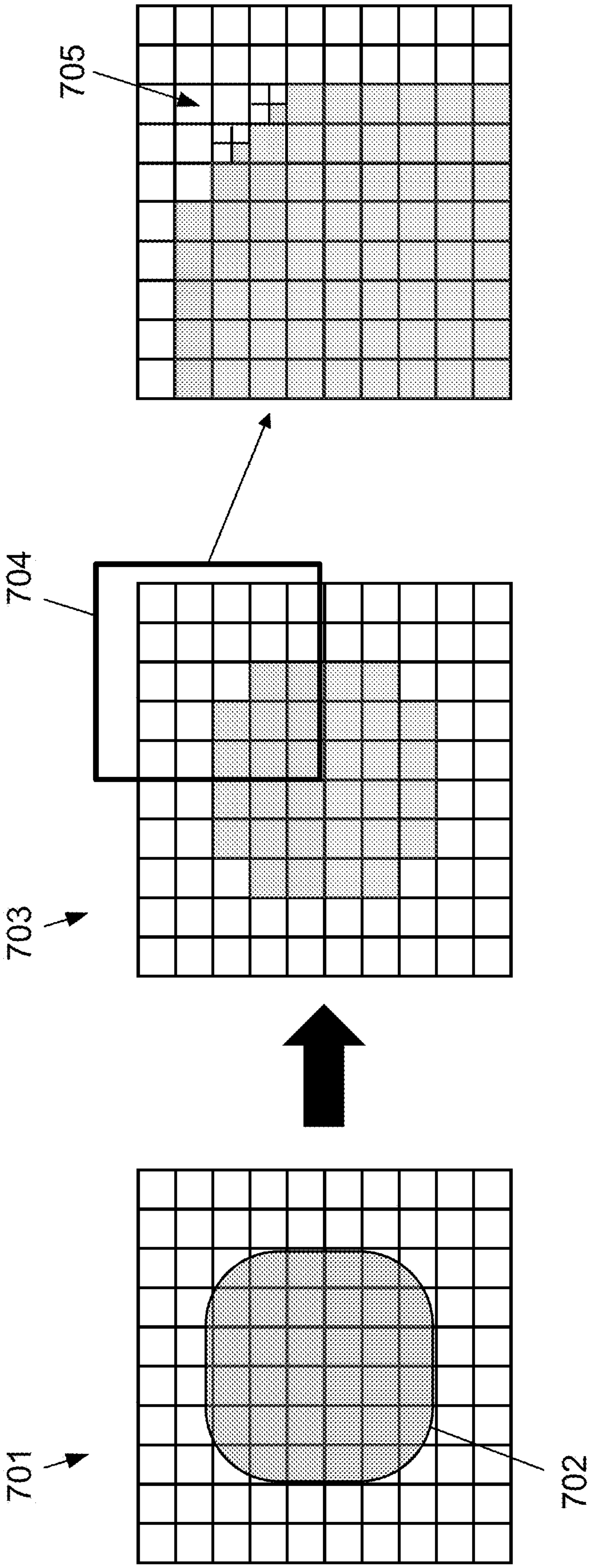
FIG. 7 depicts how pillar geometry a diffractive optical element may be optimized using pixelation according to the subject matter disclosed herein.

FIG. 7 depicts how pillar geometry a DOE may be optimized using pixelation according to the subject matter disclosed herein. A cross-sectional shape of an example pillar 702 is depicted as being pixelated at 701. At 703, the pixelated area of the cross-sectional shape of the pillar is depicted by gray shading. At 704, the corner area of the pixelated pillar may be selected for further refinement of the pixelation. The process of finer pixelation may be repeated, as indicated at 705, to more closely match a desired cross-sectional shape.

Figure 8A:
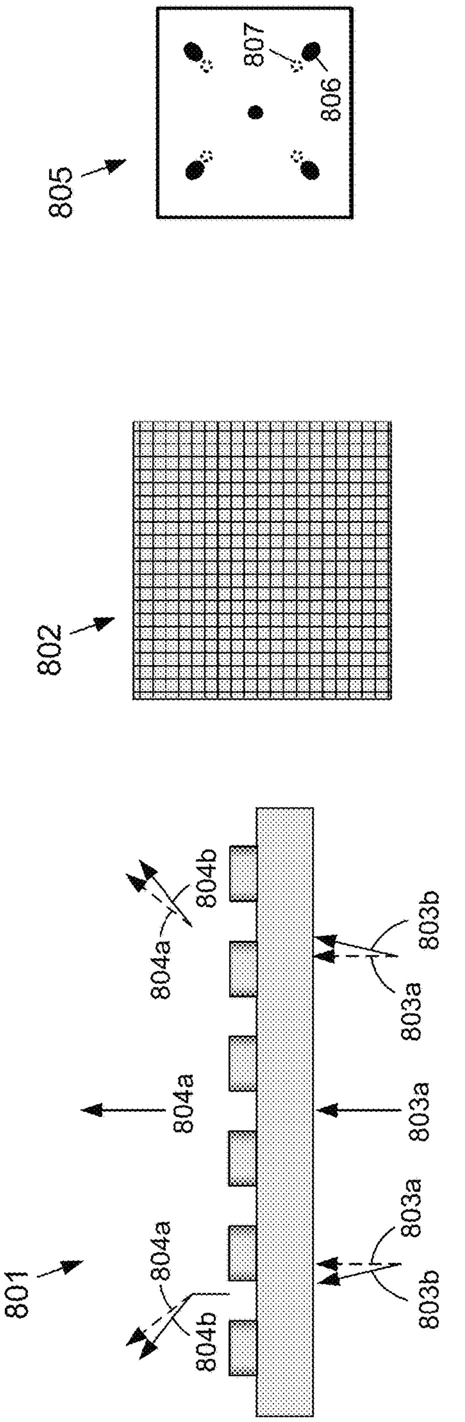
FIG. 8A depicts a diffractive optical element having a metasurface with uniform lattice periodicity and uniform pillar size according to the subject matter disclosed herein.

FIG. 8A depicts a DOE 801 having a metasurface with uniform lattice periodicity and uniform pillar size according to the subject matter disclosed herein. The uniform lattice periodicity and uniform pillar size are depicted by the uniform lattice indicated at 802. Light 803 input to the DOE 801 has been collimated, however, the light may not be perfectly collimated and may diverge due to a diverging source and a barrel effect associated with global optics. The input light 803*a* indicated by arrows having dash lines toward the periphery of the DOE 801 is idealized collimated input light, while the input light 803*b* indicated by solid-line arrows is imperfectly collimated input light. The DOE 801 diffracts the input light 803. The diffracted light corresponding to the idealized collimated input light 803*a* that is toward the periphery of the DOE 801 is depicted as dashed-line arrows 804*a*, whereas the imperfectly collimated input light 803*b* is depicted as solid-line arrows 804*b*.

A diffraction pattern 805 is generated by the DOE 801 having a uniform periodicity, a uniform pillar size, and the imperfectly collimated input light. The imperfectly collimated input light 803*b* may cause the beam shapes to become distorted and the field of view (FOV) may diverge. As depicted in the diffraction pattern 805, the light dots 806 have diverged from expected locations 807. Additionally, the shape of the light dots 806 is not round.

Figure 8B:
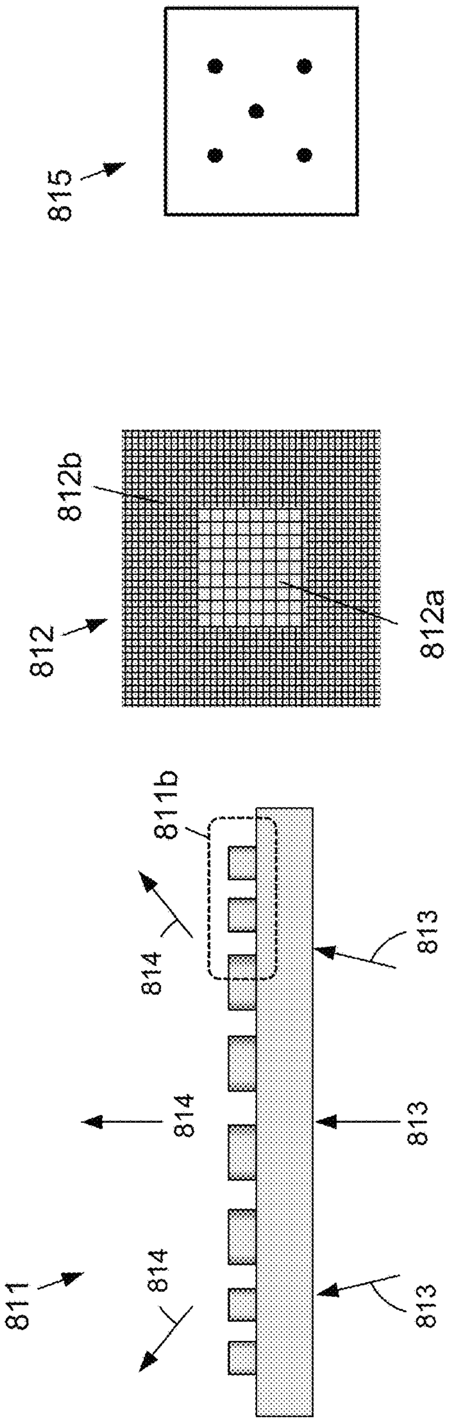
FIG. 8B depicts a diffractive optical element having a metasurface with a nonuniform periodicity and a nonuniform pillar size that compensates for imperfectly collimated input light according to the subject matter disclosed herein.

FIG. 8B depicts a DOE 811 having a metasurface with a nonuniform periodicity and a nonuniform pillar size that compensates for imperfectly collimated input light according to the subject matter disclosed herein. The nonuniform periodicity and nonuniform pillar size (width, corner radius, etc.) are depicted by the nonuniform lattice indicated at 812. Light 813 input to the DOE 811 has been imperfectly collimated and may diverge due to a diverging source and a barrel effect associated with global optics, as previously described. The imperfectly collimated input light 813*a* is indicated by solid-line arrows. The DOE 811 having a metasurface with a nonuniform periodicity and a nonuniform pillar size that compensates for imperfectly collimated input light diffracts the input light 813 and the diffracted light output from the DOE 811 is indicated at 814.

A diffraction pattern 815 is generated by the nonuniform periodicity, nonuniform pillar size and the imperfectly collimated input light, which has uniform light dots and light dots at expected locations. The nonuniform lattice periodicity indicated by the different pixelization regions shown at 812*a* and 812*b* compensates for the imperfectly collimated input light 813. The dashed region 811*b* indicated toward the edge of the DOE 811 corresponds to the region of finer periodicity 812*b*. Each region of nonuniform periodicity may also have a corresponding pillar size (width, corner radius, etc.). Although only two regions of nonuniform periodicity 812*a* and 812*b* are depicted, it should be understood that any number of nonuniform regions of periodity and/or nonuniform pillar sizes may be used. Additionally, nonuniform regions of periodity and/or nonuniform pillar sized may be of any size and/or shape. Although the DOE 811 has been described as having both nonuniform periodicity and nonuniform pillar size, a DOE disclosed herein may be configured to have one of or both nonuniform periodicity and nonuniform pillar size.

Figure 9A:
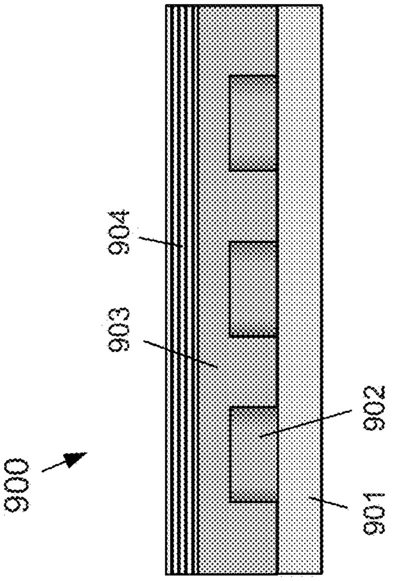
FIGS. 9A-9C depict details for a diffractive optical element that generates a uniform 3×3 diffraction pattern according to the subject matter disclosed herein.
Figure 9B:
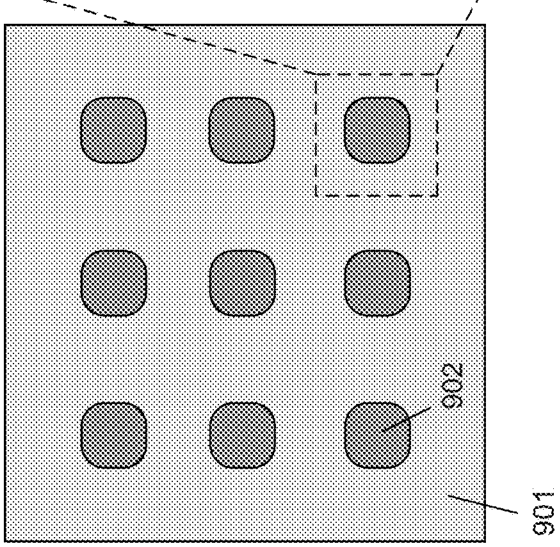
Figure 9C:
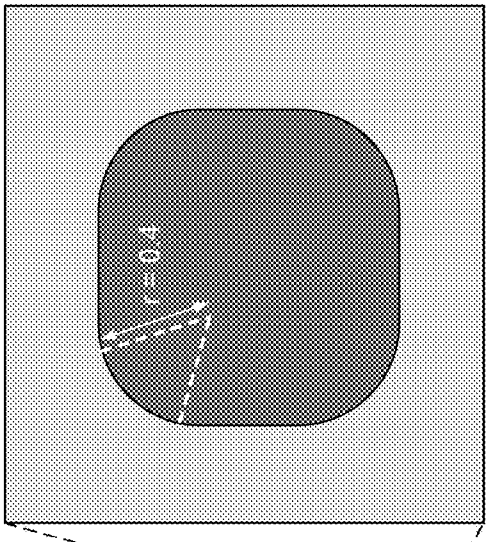

FIGS. 9A-9C depict details for a DOE that generates a uniform 3×3 diffraction pattern according to the subject matter disclosed herein. FIG. 9A depicts a side view of a portion of a DOE 900 showing that the DOE 900 includes a substrate 901, an array of pillars 902, an encapsulation layer 903, and an anti-reflection coating 904. In one embodiment, the substrate 901 may be formed from $SiO_2$. The pillars may be formed on the substrate 901 and may be formed from SiN. The pillar are formed to have a width of 0.9 μm and a height of 1.3 μm, with a lattice constant of 1.36 μm. The encapsulation layer 903 may be formed on the substrate 901 and the array of pillars 902, and may be formed from $SiO_2$. The anti-reflection coating 904 may be formed on the encapsulation layer 903. FIG. 9B depicts a plan view of the depicted portion of the DOE 900 (the encapsulation layer 903 and the anti-reflection layer 904 are not shown). FIG. 9C depicts an enlargement of a pillar 902 and indicates a corner radius of 0.4 μm to generate a uniform 3×3 diffraction pattern (not shown).

Figure 10A:
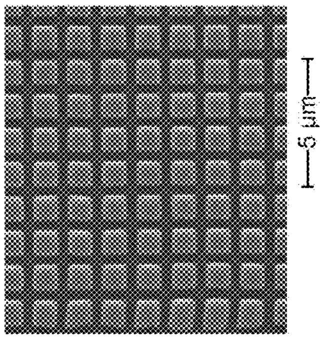
FIGS. 10A-10C are images of an example fabricated embodiment of a diffractive optical element according to the subject matter disclosed herein.
Figure 10B:
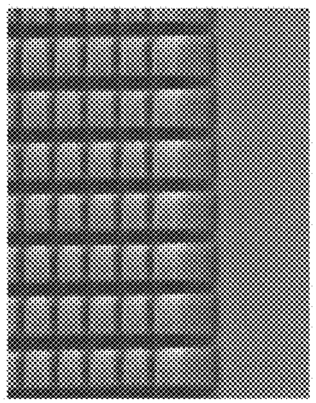
Figure 10C:
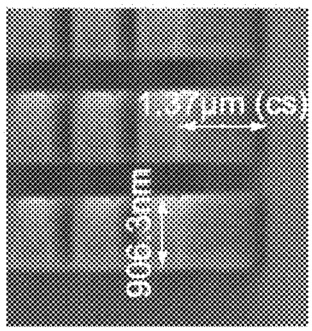
Figure 10D:
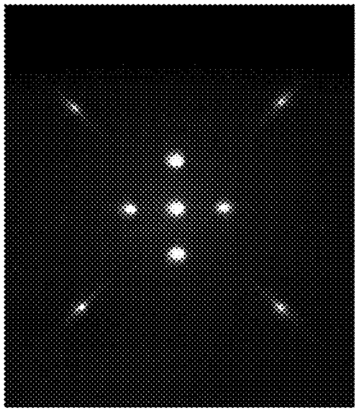
FIG. 10D is a diffraction pattern generated by the example embodiment of a DOE depicted in FIGS. 10A-10C.
Figure 11B:
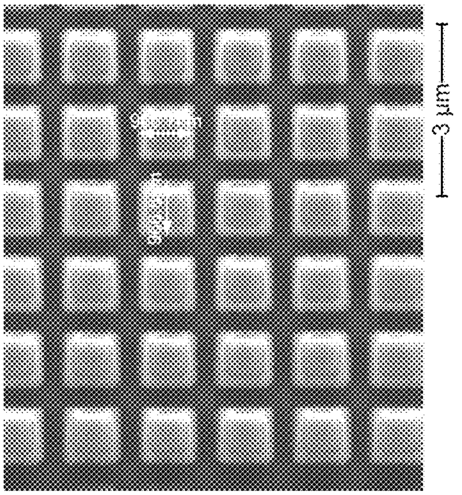
FIGS. 11A-11D depicts scanning electron microscope images of example embodiments of diffractive optical elements fabricated using different lithography beam currents according to the subject matter disclosed herein.
Figure 11D:
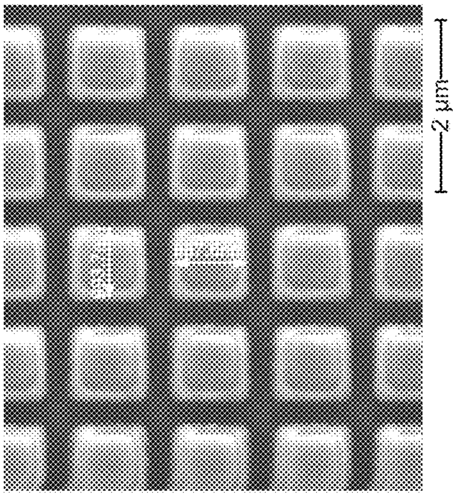
Figure 11A:
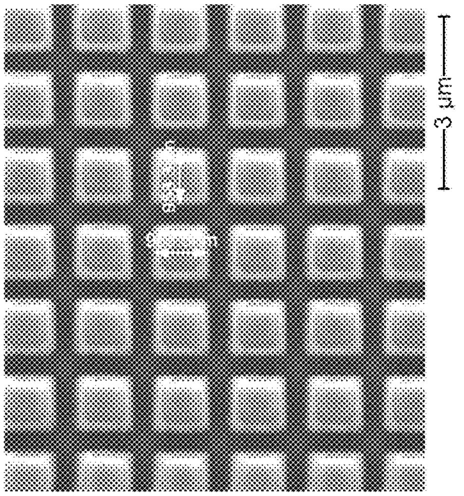
Figure 11C:
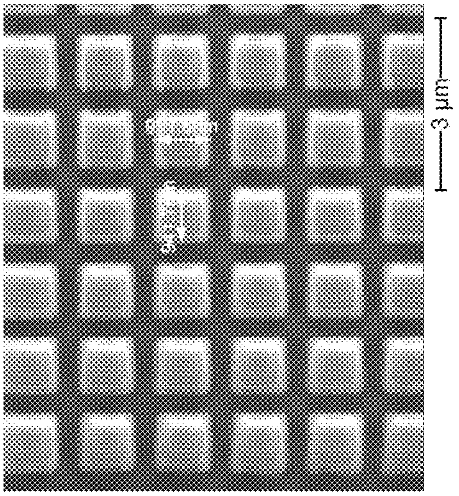

FIGS. 10A-10C are images of an example fabricated embodiment of a DOE according to the subject matter disclosed herein. The example fabricated embodiment does not include an anti-reflective, and has a transmission efficiency of 77%. A corner radius of 0.15 μm was used resulting in a light-dot intensity nonuniformity of 0.42. FIG. 10C shows nominal dimensions of an example pillar of the fabricated embodiment. The "cs" accompanying the measurement in FIG. 10C indicates that the scale bar has been adjusted so that it provides a correct measurement along the cross-sectional plane. FIG. 10D is a diffraction pattern generated by the example embodiment of a DOE depicted in FIGS. 10A-10C.

FIGS. 11A-11D depicts scanning electron microscope (SEM) images of example embodiments of DOEs fabricated using different lithography beam currents according to the subject matter disclosed herein. The embodiment shown in FIG. 11A was fabricated using a beam current of 5 nA, and has a nominal pillar width of 960 nm with a corner radius of 50 nm. The embodiment shown in FIG. 11B was fabricated using a beam current of 10 nA, and has a nominal pillar width of 965 nm with a corner radius of 150 nm. The embodiment shown in FIG. 11C was fabricated using a beam current of 50 nA, and has a nominal pillar width of 960 nm with a corner radium of 137 nm. The embodiment shown in FIG. 11D was fabricated using a beam current of 100 nA, and has a nominal pillar width of 990 nm with a corner radius of 225 nm. The electron beam dosage used in each of FIGS. 11A-11D was 350 $\mu C/cm^2$.

Figure 12B:
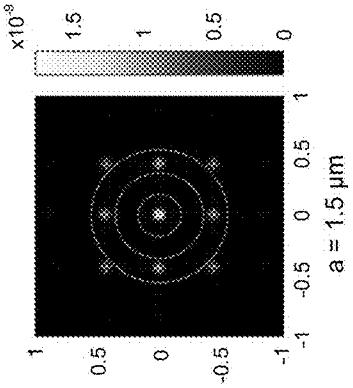
FIGS. 12B-12D are example diffraction patterns for different lattice constants according to the subject matter disclosed herein.
Figure 12C:
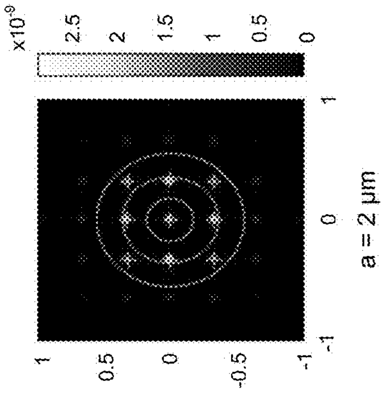
Figure 12D:
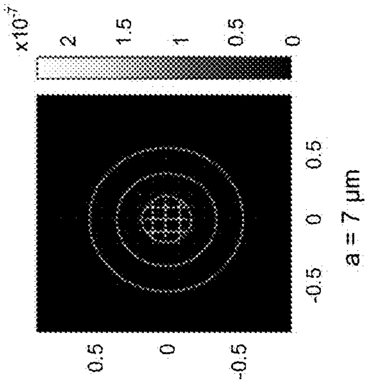
Figure 12A:
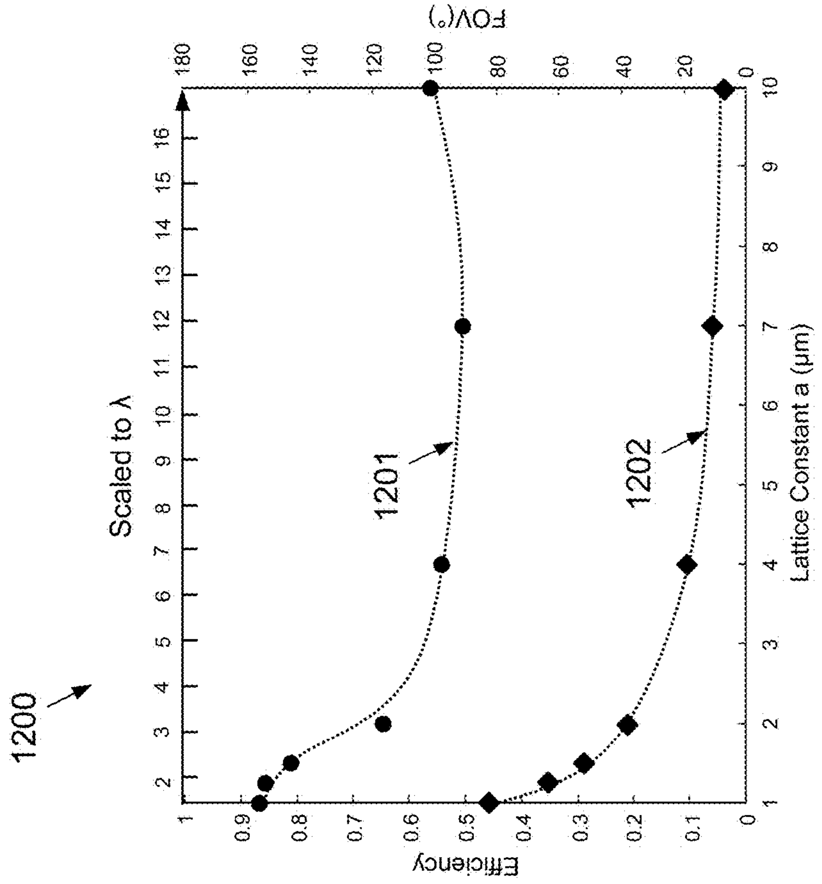
FIG. 12A is a graph of transmission efficiency and of field of view as a function of lattice constant (a) according to the subject matter disclosed herein.

FIG. 12A is a graph 1200 of transmission efficiency and of field of view (FOV) as a function of lattice constant (a) according to the subject matter disclosed herein. Curve 1201 in graph 1200 represents transmission efficiency as a function of lattice constant a, and curve 1202 represents FOV as a function of lattice constant a. Transmission efficiency for curve 1201 has been calculated only for a 3×3 region of a diffraction pattern.

FIGS. 12B-12D are example diffraction patterns for different lattice constants according to the subject matter disclosed herein. The horizontal and vertical numbering for each of FIGS. 12B-12D are arbitrary units, as are the intensity units. Each circle in the diffraction patterns represents a 10° diffraction. FIG. 12B shows a diffraction pattern for a DOE having a lattice constant a 1.5 μm. FIG. 12C shows a diffraction pattern for a DOE having a lattice constant of 2 μm. FIG. 12D shows a diffraction pattern for a DOE having a lattice constant of 7 μm.

As shown in graph 1200 and the diffraction patterns of FIGS. 12B-12D, as the lattice constant a increases, transmission efficiency tends to be reduced. Additionally, as the lattice constant a increases, the light dots of the diffraction pattern are produced within a smaller angle. That is, the FOV becomes smaller as the lattice constant a increases. Additionally, the light dots produced with a larger lattice constant have a smaller Full Width at Half Maximum (FWHM) and a higher intensity.

One example embodiment of a DOE having a substrate and pillars formed from $SiO_2$, a pillar eight of 712 nm and a lattice constant that is less that 1.5 μm provides a transmission efficiency greater than 82% and a FOV that is greater than 57° at a target wavelength of 650 nm. These performance values are confirmed by the graph 1200 in FIG. 12A.

Figure 13:
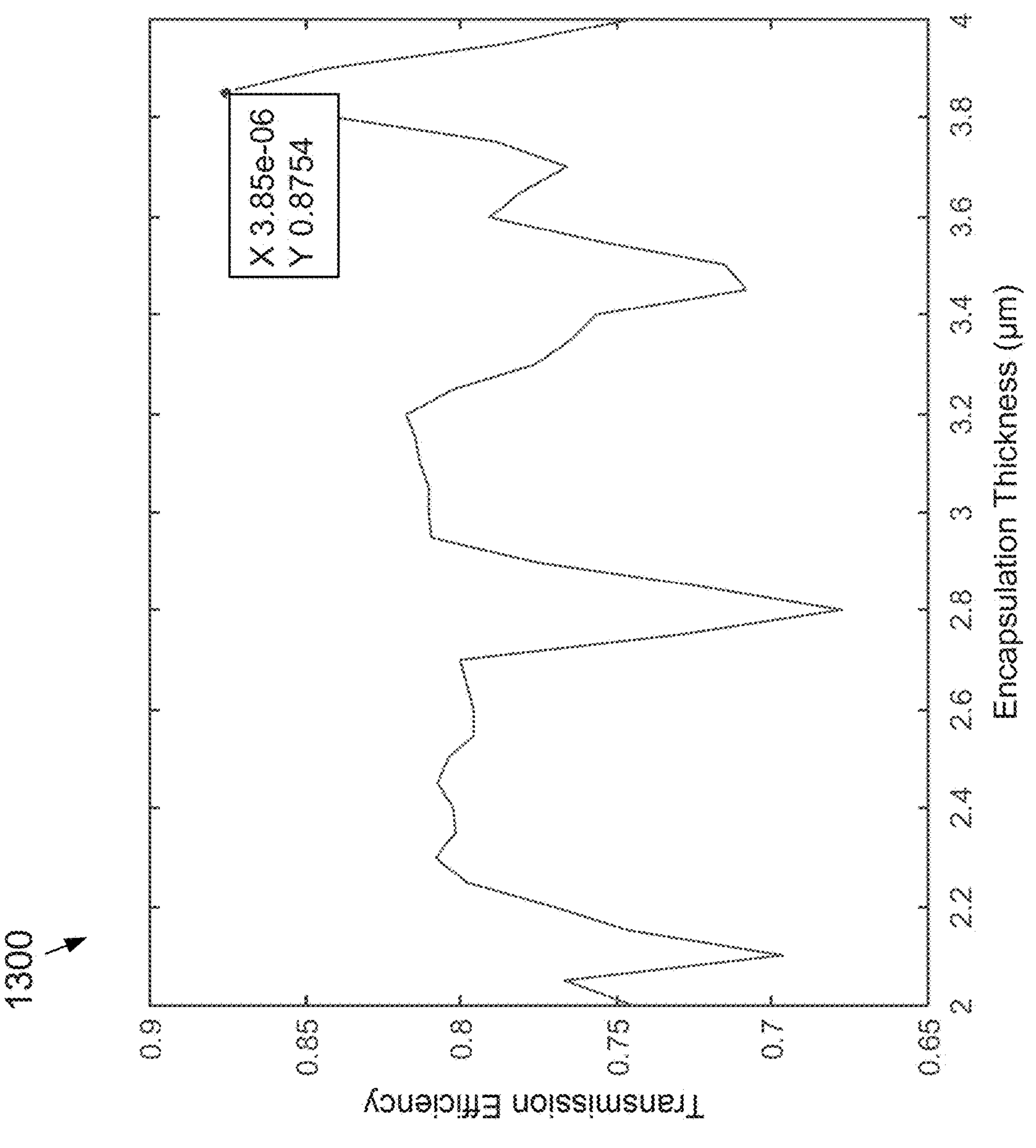
FIG. 13 is a graph of transmission efficiency as a function of thickness of encapsulation thickness according to the subject matter disclosed herein.

FIG. 13 is a graph 1300 of transmission efficiency as a function of thickness of encapsulation thickness according to the subject matter disclosed herein. For a DOE having a $SiO_2$ substrate and SiN pillars, and for a polymethyl methacrylate (PMMA) encapsulation, the highest transmission efficiency was 88% for an encapsulation thickness of $3.85\times10^{-6}$ μm. The PMMA encapsulation material has a refractive index of 1.48, whereas $SiO_2$ has a refractive index of 1.45.

Figure 14:
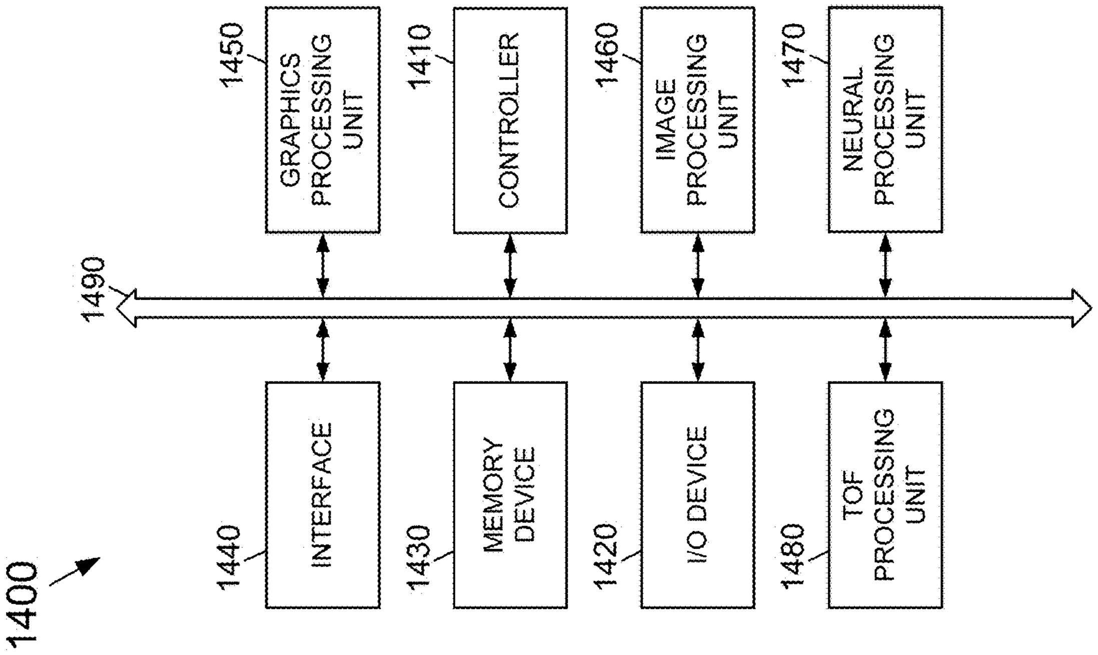
FIG. 14 depicts an electronic device that may include a diffractive optical element according to the subject matter disclosed herein.

FIG. 14 depicts an electronic device 1400 that may include a DOE according to the subject matter disclosed herein. Electronic device 1400 and the various system components of electronic device 1400 may be formed from one or modules. The electronic device 1400 may include a controller (or CPU) 1410, an input/output device 1420 such as, but not limited to, a keypad, a keyboard, a display, a touch-screen display, a 2D image sensor, a 3D image sensor, a memory 1430, an interface 1440, a GPU 1450, an imaging-processing unit 1460, a neural processing unit 1470, a TOF processing unit 1480 that are coupled to each other through a bus 1490. In one embodiment, the electronic device 1400 may include a DOE according to the subject matter disclosed herein that may be part of image processing unit 1460 and/or may be part of the TOF processing unit. In one embodiment, the 2D image sensor and/or the 3D image sensor may be part of the imaging processing unit 1460. In another embodiment, the 3D image sensor may be part of the TOF processing unit 1480. The controller 1410 may include, for example, at least one microprocessor, at least one digital signal processor, at least one microcontroller, or the like. The memory 1430 may be configured to store command codes that are to be used by the controller 1410 and/or to store a user data.

The interface 1440 may be configured to include a wireless interface that is configured to transmit data to or receive data from, for example, a wireless communication network using a RF signal. The wireless interface 1440 may include, for example, an antenna. The electronic system 1400 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A diffractive optical element (DOE), comprising:

a substrate layer; and a nanostructure layer comprising nanostructures, wherein illumination of the nanostructure layer by the target wavelength λ generates a diffraction pattern, wherein:

at least one nanostructure comprises a plan-view cross-sectional shape of a square or a rectangle, and a plan-view cross-sectional shape of at least one nanostructure comprises a first pair of line segments extending in a first parallel direction, a second pair of line segments extending in a second parallel direction, the second parallel direction being orthogonal to the first parallel direction, and a rounded corner comprising a corner radius of greater than 0.25 um and less than 0.5 um connects the first pair of line segments to the second pair of line segments.

2. The DOE of claim 1, wherein the nanostructures comprise pillar-shaped nanostructures formed on a surface of the substrate layer, holes formed in the substrate layer, or a combination thereof.

3. The DOE of claim 2, wherein:

at least one nanostructure comprises a plan-view cross-sectional shape of an ellipse, a square, or a rectangle, and a size of the nanostructures is greater than the target wavelength λ and less than 3λ, with the target wavelength λ in the visible wavelength band or the near-infrared wavelength band.

4. The DOE of claim 2, the nanostructure layer further comprising:

a first predetermined region of the nanostructure layer, the first predetermined region comprising a first predetermined periodicity and a first nominal nanostructure size, the first predetermined periodicity being greater than a target wavelength λ and less than 3λ, with the target wavelength λ in the visible wavelength band or the near-infrared wavelength band;

a second predetermined region of the nanostructure layer comprising a second predetermined periodicity and a second nominal nanostructure size, the second predetermined periodicity being greater than the target wavelength λ and less than 3λ; and the first predetermined periodicity differs from the second predetermined periodicity and the first nominal nanostructure size differs from the second nominal nanostructure size.

5. The DOE of claim 2, wherein:

the nanostructures comprise pillar-shaped nanostructures formed on the surface of the substrate layer, and a refractive index of the nanostructures is greater than a refractive index of the substrate layer.

6. The DOE of claim 2, wherein:

the nanostructures comprise holes formed in the substrate layer, and a refractive index of the nanostructures is less than a refractive index of the substrate layer.

7. The DOE of claim 4, wherein;

the second predetermined periodicity is greater than the first predetermined periodicity, and the field of view of the first predetermined region is greater than the field of view of the second predetermined region.

8. The DOE of claim 7, wherein:

the substrate layer comprises silicon dioxide, and the nanostructures comprise pillar-shaped nanostructures and comprise silicon nitride.

9. The DOE of claim 2, wherein:

illumination of the nanostructure layer by non-collimated light of the target wavelength λ generates a substantially uniform diffraction pattern.

10. The DOE of claim 1, further comprising an anti-reflective coating formed on at least one of the substrate layer and the nanostructure layer.

11. A method to fabricate a diffractive optical element (DOE), the method comprising:

forming a substrate layer; and forming a nanostructure layer comprising nanostructures, wherein illumination of the nanostructure layer by the target wavelength λ generates a diffraction pattern, wherein:

at least one nanostructure comprises a plan-view cross-sectional shape of a square or a rectangle, and a plan-view cross-sectional shape of at least one nanostructure comprises a first pair of line segments extending in a first parallel direction, a second pair of line segments extending in a second parallel direction, the second parallel direction being orthogonal to the first parallel direction, and a rounded corner comprising a corner radius of greater than 0.25 μm and less than 0.5 μm connects the first pair of line segments to the second pair of line segments.

12. The method of claim 11, wherein the nanostructures comprise pillar-shaped nanostructures formed on the surface of the substrate layer, holes formed within the substrate layer, or a combination thereof.

13. The method of claim 12, wherein:

at least one nanostructure comprises a plan-view cross-sectional shape of an ellipse, a square, or a rectangle, and a size of the nanostructures is greater than the target wavelength λ and less than 3λ, with the target wavelength λ in the visible wavelength band or the near-infrared wavelength band.

14. The method of claim 12, the nanostructure layer further comprising:

a first predetermined region of the nanostructure layer, the first predetermined region comprising a first predetermined periodicity and a first nominal nanostructure size, the first predetermined periodicity being greater than a target wavelength λ and less than 3λ, with the target wavelength λ in the visible wavelength band or the near-infrared wavelength band, a second predetermined region of the nanostructure layer comprising a second predetermined periodicity and a second nominal nanostructure size, the second predetermined periodicity being greater than the target wavelength λ and less than 3λ, and the first predetermined periodicity differs from the second predetermined periodicity and the first nominal nanostructure size differs from the second nominal nanostructure size.

15. The method of claim 12, wherein:

the nanostructures comprise pillar-shaped nanostructures formed on the surface of the substrate layer, and a refractive index of the nanostructures is greater than a refractive index of the substrate layer.

16. The method of claim 12, wherein:

the nanostructures comprise holes formed in the substrate layer, and a refractive index of the nanostructures is less than a refractive index of the substrate layer.

17. The method of claim 14, wherein:

the second predetermined periodicity is greater than the first predetermined periodicity, and the field of view of the first predetermined region is greater than the field of view of the second predetermined region.

18. The method of claim 12, wherein:

the substrate layer comprises silicon dioxide, and the nanostructures comprise pillar-shaped nanostructures and comprise silicon nitride.

19. The method of claim 12, wherein: illumination of the nanostructure layer by non-collimated light of the target wavelength λ generates a substantially uniform diffraction pattern.

20. The method of claim 11, further comprising forming an anti-reflective coating on at least one of the substrate layer and the nanostructure layer.

* * * * *